United States Patent [19]

Clark

[11] Patent Number: 5,330,329
[45] Date of Patent: Jul. 19, 1994

[54] SUCTION CONDUIT ASSEMBLY MOUNTING

[75] Inventor: Brian D. Clark, Troy, Ohio
[73] Assignee: Copeland Corporation, Sidney, Ohio
[21] Appl. No.: 68,791
[22] Filed: Jun. 1, 1993
[51] Int. Cl.⁵ .......................... F04B 21/00
[52] U.S. Cl. .................. 417/312; 181/403
[58] Field of Search .......... 417/312, 902; 181/403

[56] References Cited

U.S. PATENT DOCUMENTS

| | | | |
|---|---|---|---|
| 3,864,064 | 2/1975 | Gannaway | 417/313 |
| 4,239,461 | 12/1980 | Elson | 417/312 |
| 4,370,104 | 1/1983 | Nelson et al. | 417/312 |
| 4,401,418 | 8/1983 | Fritchman | 417/312 |
| 4,412,791 | 11/1983 | Lal | 417/312 |
| 4,477,229 | 10/1989 | Kropiwnicki et al. | 417/53 |
| 4,582,468 | 4/1986 | Bar | 417/312 |
| 4,969,804 | 11/1990 | Gannaway | 417/902 |
| 5,015,155 | 11/1990 | Brown | 417/902 |
| 5,039,287 | 5/1991 | Da Costa | 417/902 |
| 5,129,793 | 7/1992 | Blass et al. | 417/312 |
| 5,205,719 | 4/1993 | Childs et al. | 417/312 |

Primary Examiner—Richard A. Bertsch
Assistant Examiner—Peter Korytnyk
Attorney, Agent, or Firm—Harness, Dickey & Pierce

[57] ABSTRACT

A suction conduit assembly mounting has a plurality of retaining tabs located at the open end of the suction conduit assembly which mates with a plurality of slots located in a motor cover of a compressor. The plurality of tabs are aligned with the plurality of slots, the suction conduit assembly is assembled to the motor cover and rotated into position. An integral annular sealing ring is located on the open end of the suction conduit assembly spaced inward from the plurality of retaining tabs. The assembly of the suction conduit assembly elastically deflects the annular sealing ring to effect a seal between the motor cover and the suction conduit assembly as well as eliminating any type of noise or rattle caused by relative movement of the two components.

10 Claims, 5 Drawing Sheets

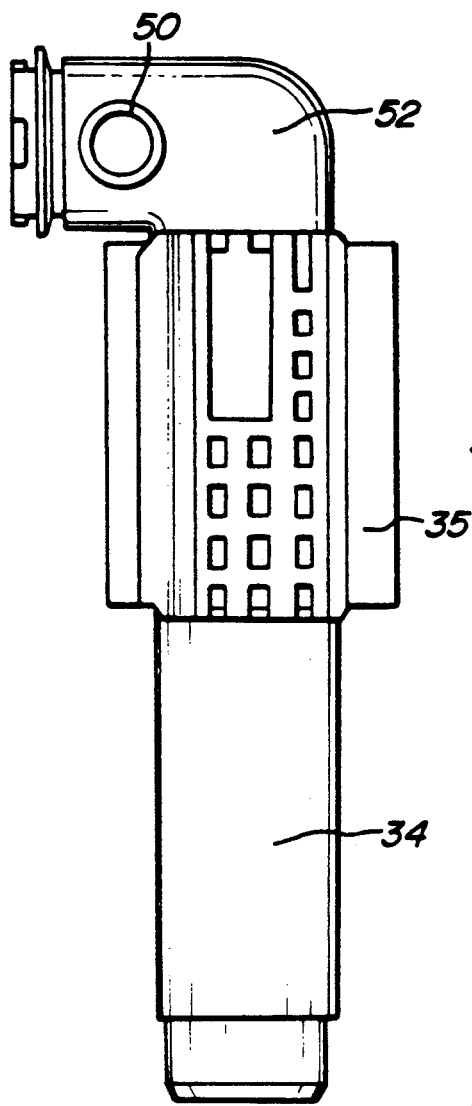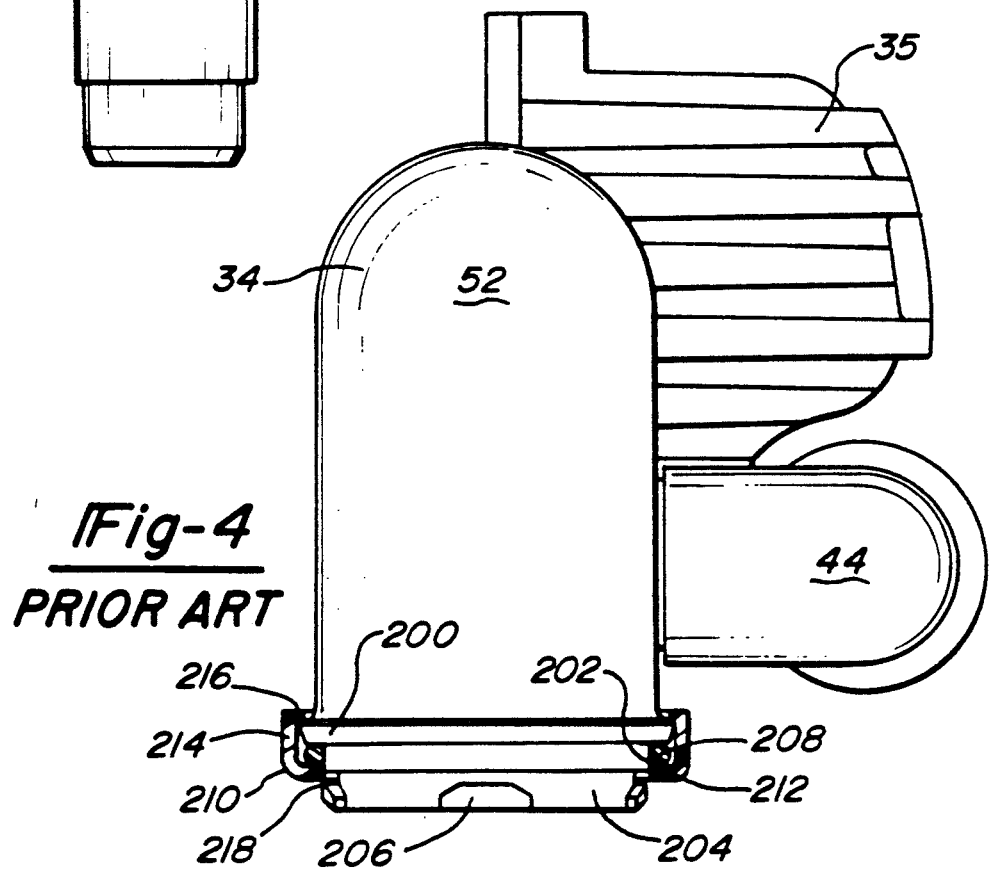
*Fig-3*
*Fig-4*
PRIOR ART

SUCTION CONDUIT ASSEMBLY MOUNTING

FIELD OF THE INVENTION

The present invention relates generally to refrigerant compressors. More particularly, the present invention relates to refrigerant compressors of the reciprocating piston type which employ a suction gas muffler for attenuating noise resulting from the operation of the compressor.

BACKGROUND AND SUMMARY OF THE INVENTION

When designing high efficiency compressors, it is important to provide relatively unrestricted suction gas flow to the compressor. This compressor suction process results in the generation of substantial noise due both to the rapid flow of suction gas into the compressor as well as the operation of the intake valving. Accordingly, it is desirable to provide some form of noise attenuating means in the suction gas flow path. When providing this noise attenuating means it is also important to overall compressor efficiency, as mentioned above, to insure a relatively free unrestricted flow of suction gas to the compressor. Accordingly, the use of various baffles and forms of restrictions in the main flow path is undesirable in that these device may create excessive flow losses requiring larger conduits to be utilized to prevent compressor suction starvation.

Currently, design parameters require the compressor to be as compact as possible, thus limiting the available space within the assembly for a suction muffler. This limited available space imposes several constraints on the physical size of the suction mufflers. Further, because of these space limitations, it is often necessary to extend the suction gas conduit in close proximity to the compressor's discharge muffler and the compressor's discharge conduits. Accordingly, as the discharge gas is relatively hot due to the compression process, the transfer of heat from the discharge gas to the suction gas can occur. It is desirable to minimize this heat transfer to the suction gas so as to maintain a high volumetric efficiency.

Accordingly, the present invention provides a refrigerant compressor having an improved suction gas muffler which effectively attenuates noise generated from the above-mentioned sources while still enabling relatively free unrestricted flow to the compressor. The suction gas muffler of the present invention is of the side branch type and comprises a relatively large diameter conduit having a housing secured thereto which defines a pair of side branch chambers each of which may be tuned to a different fundamental frequency. A pair of longitudinally spaced openings provide communication with each of the respective chambers and serves to define an impedance tube therebetween which may be tuned to attenuate a third fundamental frequency. Integrally formed baffles and ribs within each of the chambers further aid in noise attenuation by eliminating standing waves within the chambers as well as enhancing the rigidity of the muffler. The muffler is preferably fabricated from a polymeric composition so as to minimize heating of the suction gas being supplied to the compressor. Further, the use of such polymeric materials enables the suction conduit and muffler to be very inexpensively fabricated by suitable forming means such as, for example, injection molding.

The suction muffler is mounted to the motor cover using a twist lock design which incorporates a novel formed-in ring which creates a lip seal between the motor cover and the suction muffler. This integral sealing ring eliminates the need and associated costs of having an O-ring and snap-on sleeve mounting system common to assignee's prior art design as shown in assignee's U.S. Pat. No. 5,129,793.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a longitudinal side view of the suction muffler incorporating the mounting system of the present invention;

FIG. 4 is an enlarged view partially in cross section showing the sealing arrangement of the prior art suction muffler;

DETAILED DESCRIPTION OF THE PREFERRED EMBODIMENT

Figure 1:
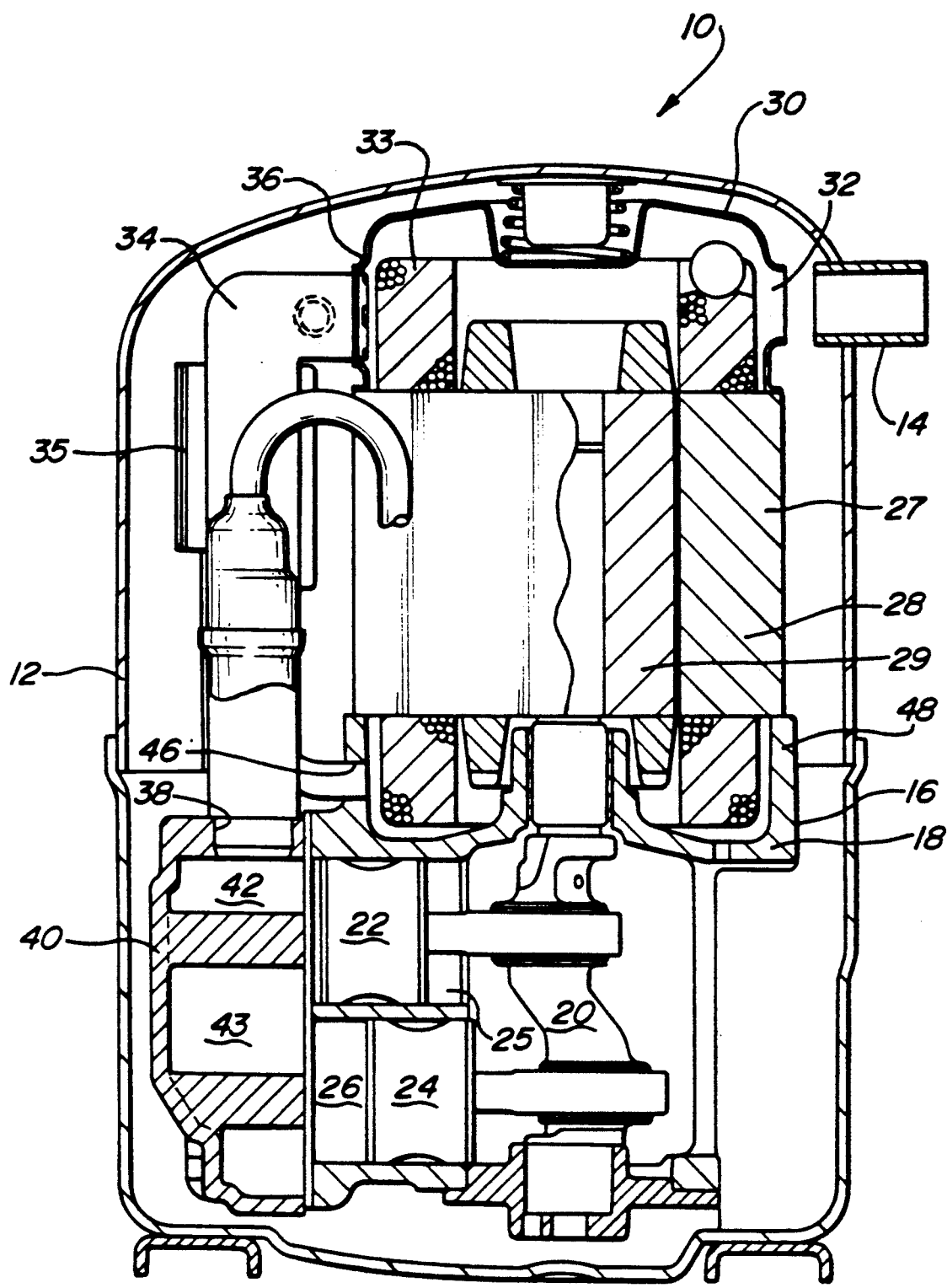
FIG. 1 is a vertical cross sectional view of a refrigeration compressor in accordance with the present invention.

Referring now to the drawings and in particular to FIG. 1, there is shown a refrigeration compressor of the hermetic reciprocating piston type indicated generally at 10. Refrigeration compressor 10 includes an outer shell 12 having a suction inlet 14 and a motor compressor assembly 16 resiliently mounted therein.

Motor compressor 16 includes a compressor housing 18 having a crankshaft 20 rotatably journaled therein and operative to reciprocate pistons 22 and 24 within respective cylinders 25, 26. A motor assembly 27 includes a stator 28 having a lower end secured to compressor housing 18 and a rotor 29 secured to crankshaft 20 so as to rotatably drive same. A motor cover 30 is secured to and encloses the upper end of stator 28 and includes an outwardly flared suction inlet opening 32 positioned in spaced aligned facing relationship to suction inlet 14.

A suction conduit assembly 34, shown in FIG. 3, including a suction muffler portion 35 is also provided having one end fitted within an opening 36 provided in the sidewall of motor cover 30, the other end extending downwardly and fitted within an opening 38 provided in head 40 whereby suction gas is supplied to respective cylinders 25, 26 via suction chamber 42 and compressed gas is discharged therefrom into discharge chamber 43.

Figure 2:
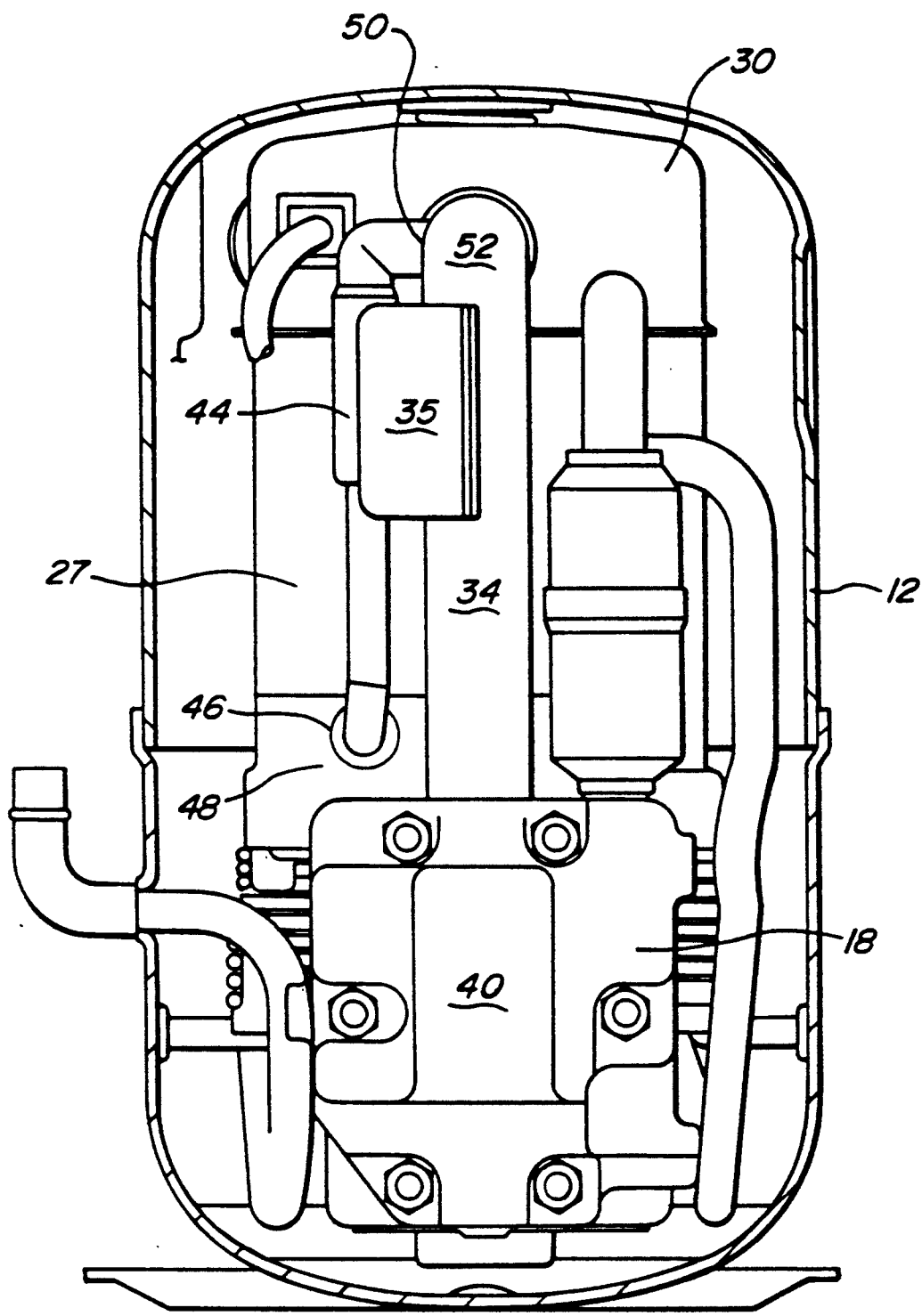
FIG. 2 is a view in elevation of the refrigeration compressor of FIG. 1 rotated approximately 90 degrees with the outer shell shown in section.

As shown in FIG. 2, a bypass conduit 44 is also provided having one end fitted within an opening 46 provided in annular flange portion 48 of compressor housing 18. The other end of bypass conduit 44 extends upwardly alongside of suction muffler 34 and is fitted within an opening 50 provided in the sidewall of upper conduit portion 52 of suction conduit assembly 34. Preferably both suction conduit assembly 34 and bypass conduit 44 will be fabricated from a material having a relatively low coefficient of heat transfer such as polymeric composition so as to minimize the heating of the suction gas flowing to the compressor.

Up to this point the compressor and suction muffler are known in the art and the essential details thereof are disclosed in Assignee's U.S. Pat. No. 5,129,793 the disclosure of which is hereby incorporated herein by reference.

FIG. 4 shows the attachment and sealing arrangement utilized between the prior art suction mufflers and motor cover 30. Upper end 52 of system conduit assembly 34 is provided with an annular collar 200. Located axially outward from annular collar 200 is an annular flange 202 and extending axially outward from annular flange 202 is an annular section 204. Extending radially outward from the open end of annular section 204 are a plurality of retaining tabs 206. The outside diameter of annular flange 202 is sized to receive an O-ring 208 for sealing the connection to opening 36 in motor cover 30. A snap-on sleeve 210 is provided which has an inside diameter 212 designed to fit over annular flange 202 and an outer sleeve 214 which fits over annular collar 200. A radially inwardly projecting tab 216 snaps over annular collar 200 to retain sleeve 210 with O-ring 208 being placed in a slightly compressed condition to effect a seal between annular collar 200 and sleeve 210. The width of outer sleeve 214 is selected such that when tab 216 is snapped over collar 200, O-ring 208 is placed in slight compression between sleeve 210 and collar 200. In addition, the gap 218 between sleeve 210 and the plurality of retaining tabs 206 is less than the thickness of the material forming motor cover 30. When assembly of suction conduit assembly 34 to motor cover 30 is required, the plurality of retaining tabs 206 are aligned with a plurality of corresponding slots (not shown) in motor cover 30. Suction conduit assembly 34 is then pushed towards motor cover 30 until retaining tabs 206 extend beyond the inside surface of motor cover 30. Suction conduit assembly 34 is then rotated into position with motor cover 30 being sandwiched between retaining tabs 206 and sleeve 210 to retain suction conduit assembly 34 onto motor cover 30. This assembly of suction conduit assembly 34 onto motor cover 30 causes further compression of O-ring 208 due to gap 218 initially being smaller than the thickness of the material forming motor cover 30. The force exerted by the compressed O-ring 208 creates a seal between snap-on sleeve 210 and motor cover 30 and also acts to eliminate any type of noise or rattling caused by the movement between suction conduit assembly 34 and motor cover 30.

Figure 5:
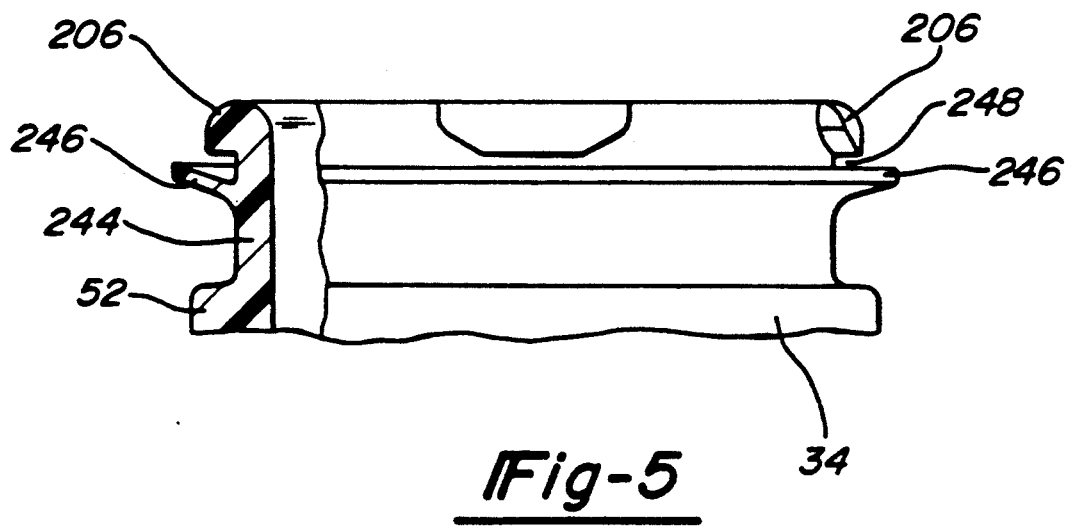
FIG. 5 is an enlarged view showing the sealing arrangement according to the present invention in an unassembled condition.
Figure 6:
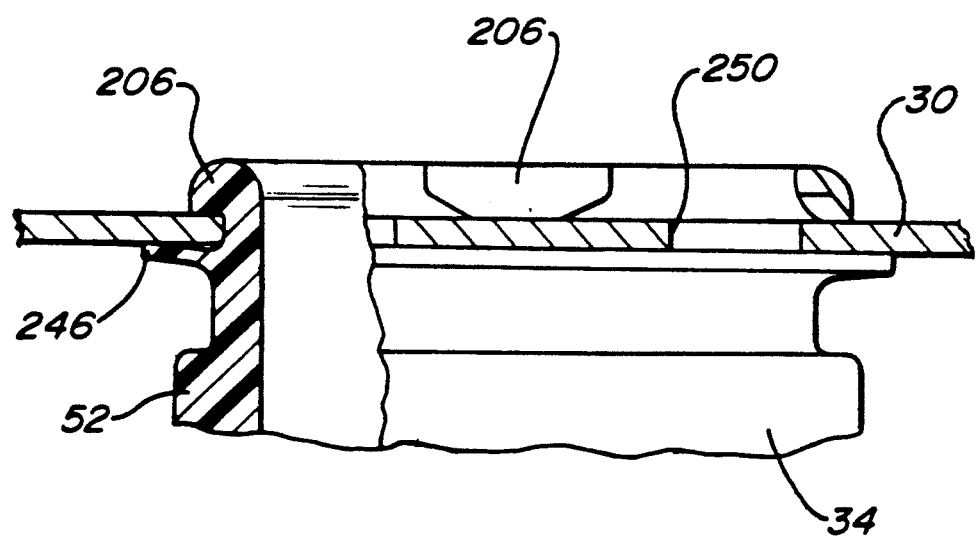
FIG. 6 is an enlarged view showing the sealing arrangement according to the present invention in an assembled condition.

FIGS. 5 and 6 show the attachment and sealing arrangement according to the present invention. Upper end 52 of suction conduit assembly 34 is provided with an annular section 244 extending therefrom. Extending radially outward from the open end of annular section 244 are the plurality of retaining tabs 206 similar to those shown in FIG. 4. An integral annular sealing ring 246 extends radially outward from annular section 244 and is located between the plurality of retaining tabs 206 and upper end 52 of suction conduit assembly 34. Annular ring 246 is angled slightly towards the open end of suction conduit assembly 34 as can best be seen in FIG. 5, the unassembled illustration. In the preferred embodiment, annular ring 246 is angled approximately 14° towards the open end of suction conduit assembly 34. Annular sealing ring 246 is positioned on annular section 244 such that the gap 248 between the tip of annular sealing ring 246 and the plurality of retaining tabs 206 is less than the thickness of the material forming motor cover 30. When assembly of suction conduit assembly 34 to motor cover 30 is required, the plurality of retaining tabs 206 are aligned with a plurality of corresponding slots 250 in motor cover 30. Suction conduit assembly 34 is then pushed towards motor cover 30 until retaining tabs 206 extend beyond the inside surface of motor cover 30. Suction conduit assembly 34 is then rotated into position with motor cover 30 being sandwiched between retaining tabs 206 and annular ring 246 to retain suction conduit assembly 34 onto motor cover 30 as shown in FIG. 6. This assembly of suction conduit assembly 34 onto motor cover 30 causes elastic deformation of annular ring 246 due to gap 248 initially being smaller than the thickness of the material forming motor cover 30. The force exerted by the elastic deformation of annular ring 246 creates a lip type seal between annular ring 246 and motor cover 30 and also acts to eliminate any type of noise or rattling caused by the movement between suction conduit assembly 34 and motor cover 30.

Thus, the addition of annular ring 246 to the upper end 52 of suction conduit assembly 34 eliminates the need for the additional components of the prior art including O-ring 208 and sleeve 210 along with their associated costs, complexities and assembly requirements.

Figure 7:
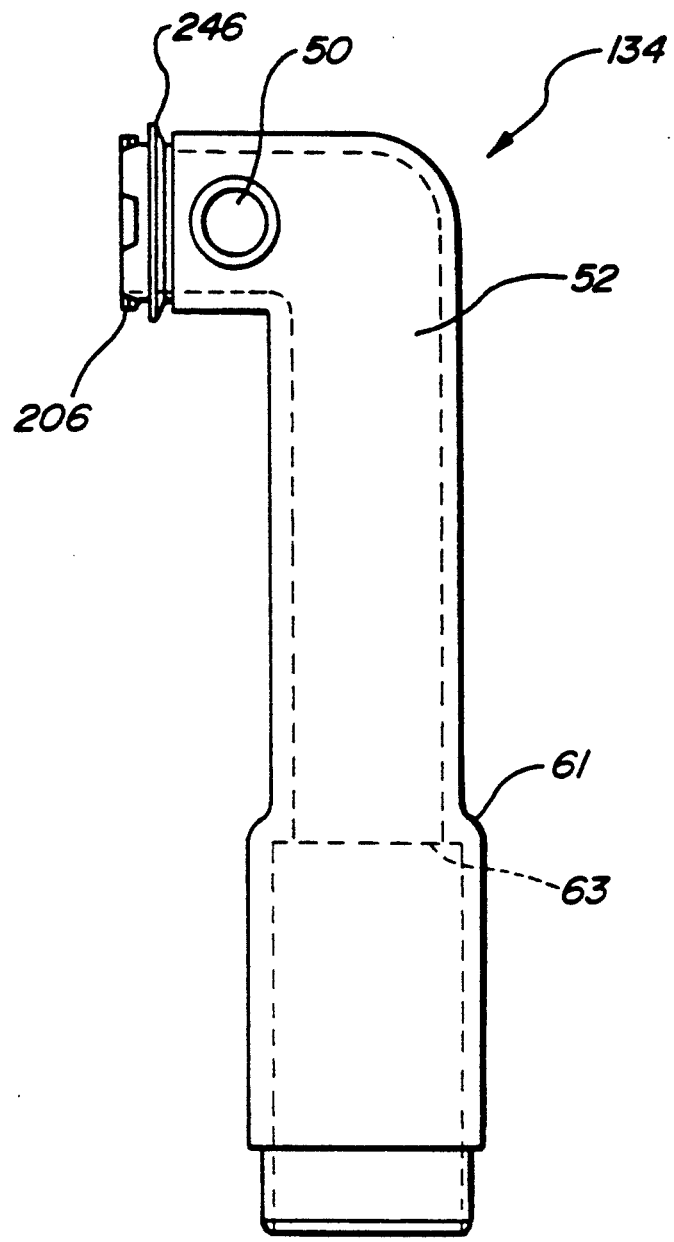
FIG. 7 is a view in elevation of a suction conduit according to another embodiment of the present invention.

Referring now to FIG. 7, a suction gas conduit 134 is shown according to another embodiment of the present invention. Suction conduit 134 is similar to suction conduit 34 with the exception of suction muffler portion 35, which has been eliminated. In addition, the internal and external diameters of suction conduit 134 are increased in diameter at 61. This increase in diameter provides a step 63 on the internal diameter of suction conduit 134 which is operative to reflect pressure waves coming from the compressor cylinder inlet. In addition, the increase in diameter serves to reduce the suction work required of the compressor which thus improves the efficiency of the compressor. This stepped design of suction conduit is described more fully in assignee's copending patent application Ser. No. 08/049,985 filed Apr. 16, 1993 and entitled "Suction Gas Conduit", the disclosure of which is hereby incorporated herein by reference. The remaining details of suction conduit 134 are similar to suction conduit 34 including opening 50 provided in the sidewall of upper conduit portion 52. Suction conduit 134 thus provides an unrestricted suction gas flow to compressor 10.

While the above detailed description describes the preferred embodiment of the present invention, it should be understood that the present invention is susceptible to modification, variation and alteration without deviating from the scope and fair meaning of the subjoined claims.

What is claimed is:
1. A suction conduit assembly comprising:
an elongated suction conduit having a first end and a second end, said first end adapted to be secured to motor means, said suction conduit defining a relatively unrestricted suction gas flowpath there- through, said first end of said suction conduit having a plurality of circumferentially spaced radially outwardly extending retaining tabs and an annular ring spaced from said plurality of retaining tabs and extending radially outward from said first end of said suction conduit to define a generally annular gap between said plurality of retaining tabs and said annular ring, said annular ring being angled towards said plurality of retaining tabs.

2. The suction conduit assembly of claim 1 further comprising muffler means secured to said suction conduit, said muffler means including at least one sound attenuating chamber communicating with said suction gas flowpath.

3. The suction conduit assembly of claim 2 wherein said suction conduit and said muffler means are fabricated from a polymeric composition.

4. The suction conduit assembly of claim 1 wherein said suction conduit is fabricated from a polymeric composition.

5. The suction conduit assembly of claim 1 wherein said elongated suction conduit is increased in diameter between said first end of said suction conduit and said second end.

6. A refrigeration compressor comprising:
an outer shell;
compressor means disposed within said shell;
motor means disposed within said shell drivingly connected to said compressor means;
an elongated suction conduit having a first end secured to said motor means and a second end secured to said compressor means; said suction conduit defining a relatively unrestricted suction gas flowpath therethrough, said first end of said suction conduit having a plurality of circumferentially spaced radially outwardly extending retaining tabs and an integral annular ring spaced from said plurality of retaining tabs and extending radially outward from said first end of said suction conduit to define a generally annular gap between said plurality of retaining tabs and said integral annular ring, said motor means defining an opening having a plurality of circumferentially spaced slots adapted to mate with said plurality of retaining tabs of said first end of said suction conduit such that when said first end of said suction conduit is assembled into said opening and indexed, a portion of said motor means is disposed within said generally annular gap of said suction conduit, said portion of said motor means operable to deflect said integral annular ring of said suction conduit to form a generally fluid tight connection between said suction conduit and said motor means.

7. The refrigerant compressor of claim 6 further comprising muffler means secured to said suction conduit, said muffler means including at least one sound attenuating chamber communicating with said suction gas flowpath.

8. The refrigerant compressor of claim 6 wherein said annular ring of said suction conduit is angled towards said plurality of retaining tabs.

9. The refrigerant compressor of claim 6 wherein said suction conduit and said muffler means are fabricated from a polymeric composition.

10. The suction conduit assembly of claim 6 wherein said elongated suction conduit is increased in diameter between said first end of said suction conduit and said second end.

* * * * *